(12) United States Patent  
Brass (10) Patent No.: US 8,893,939 B2
(45) Date of Patent: Nov. 25, 2014

(54) TRAILER HITCH STORAGE APPARATUS

(75) Inventor: Ronald Anthony Brass, Brandon (CA)

(73) Assignee: Brass Wolf Enterprises Ltd., Vancouver (CA)

( * ) Notice: Subject to any disclaimer, the term of this patent is extended or adjusted under 35 U.S.C. 154(b) by 507 days.

(21) Appl. No.: 12/868,643

(22) Filed: Aug. 25, 2010

(65) Prior Publication Data

US 2012/0049484 A1    Mar. 1, 2012

(51) Int. Cl.
*B60D 1/60* (2006.01)

(52) U.S. Cl.
CPC .................................... *B60D 1/60* (2013.01)
USPC ......................... 224/515; 224/519; 224/558

(58) Field of Classification Search
USPC .................. 224/489, 558, 515, 519; 248/674
See application file for complete search history.

(56) References Cited

U.S. PATENT DOCUMENTS

| | | | | |
|---|---|---|---|---|
| 4,046,398 A * | 9/1977 | Dunwoody | ................ | 280/415.1 |
| 5,476,279 A | 12/1995 | Klemetsen | | |
| 5,678,839 A * | 10/1997 | Pobud et al. | ................ | 280/491.5 |
| 6,125,945 A | 10/2000 | Skaggs et al. | | |
| 6,149,181 A | 11/2000 | Biederman | | |
| 6,234,512 B1 | 5/2001 | Bettenhausen | | |
| 6,467,417 B1 * | 10/2002 | Guyot et al. | ................... | 108/44 |
| 6,523,846 B1 * | 2/2003 | Bennett et al. | ................ | 280/163 |
| 6,644,525 B1 * | 11/2003 | Allen et al. | ................... | 224/497 |
| 6,832,709 B2 | 12/2004 | Henry | | |
| 6,986,523 B1 * | 1/2006 | Bickford | ................... | 280/414.1 |
| 7,055,844 B1 | 6/2006 | Bostedt | | |
| 7,258,359 B2 | 8/2007 | Wooten | | |
| 7,661,543 B1 | 2/2010 | Townsend | | |
| 7,661,693 B1 | 2/2010 | Lipski | | |
| 8,079,611 B2 * | 12/2011 | Schroeder | ................ | 280/491.5 |
| 8,251,265 B2 * | 8/2012 | Grudek | ................... | 224/42.12 |
| 2002/0017770 A1 | 2/2002 | Parrish | | |
| 2003/0057676 A1 | 3/2003 | Griggs et al. | | |
| 2004/0150189 A1 | 8/2004 | Deanda | | |
| 2006/0220347 A1 | 10/2006 | Witchey | | |
| 2008/0224448 A1 | 9/2008 | Siemantel et al. | | |
| 2008/0264991 A1 * | 10/2008 | Foster | ................... | 224/519 |
| 2009/0140024 A1 * | 6/2009 | McLemore et al. | ................... | 224/519 |

* cited by examiner

*Primary Examiner* — Adam Waggenspack
*Assistant Examiner* — John Cogill
(74) *Attorney, Agent, or Firm* — Cameron IP (57) ABSTRACT

The present invention relates to a trailer hitch storage apparatus for storing a trailer hitch on a trailer having a frame. The apparatus includes a trailer hitch receptacle shaped to receive the trailer hitch. The apparatus includes a pair of spaced-apart side plates. The side plates have first ends. At least one of the first ends of the side plates is connected to the trailer hitch receptacle. The side plates have second ends opposite the first ends which extend outwards from the trailer hitch receptacle. The side plates are configured to receive the frame of the trailer between the side plates. The apparatus includes a connector connected to the side plates near the second ends of the side plates. The connector is extendable between the side plates for fixedly securing the frame of the trailer.

20 Claims, 11 Drawing Sheets

TRAILER HITCH STORAGE APPARATUS

FIELD OF THE INVENTION

The present invention relates to trailer hitches. In particular, the invention relates to a trailer hitch storage apparatus.

DESCRIPTION OF THE RELATED ART

It is known to have a trailer hitch storage device that is installed for example on a wall of a garage. However such devices may not be convenient where a trailer hitch is required but the vehicle is not near the garage, such as, for example, when one is out camping or boating. These devices oftentimes also require that existing walls be modified for their installation.

It is also known to have a trailer hitch storage device that attaches to a vehicle. However such devices may be exposed to debris, dirt and the like. This may lead to premature wear. The exposed nature of such storage devices may also result in an increased risk of either the trailer hitch or the trailer hitch storage device falling off of the vehicle. This in turn may result in an increased safety risk for other vehicles on the road, as well as an increased risk of and thus cost arising from equipment loss.

Other devices may be relatively slender and thus more prone to failure through general fatigue in addition to the above set out wear and tear.

Still other devices require that modifications, such as drilling and the like, be made to the vehicle. This in turn may lead to a depreciation of the vehicle's net re-sale value.

BRIEF SUMMARY OF INVENTION

The present invention provides a trailer hitch storage apparatus disclosed herein that overcomes the above disadvantages. It is an object of the present invention to provide an improved trailer hitch storage apparatus.

There is accordingly provided, in combination, a trailer and a trailer hitch storage apparatus for storing a trailer hitch on the trailer. The trailer has a frame. The trailer hitch storage apparatus includes a trailer hitch receptacle shaped to receive the trailer hitch. The trailer hitch storage apparatus includes a mount for connecting to the trailer. The mount is shaped to receive the frame of the trailer. The mount operatively connects to and angularly extends outwards from the trailer hitch receptacle.

There is also provided a trailer hitch storage apparatus for storing a trailer hitch on a trailer having a frame. The apparatus includes a trailer hitch receptacle shaped to receive the trailer hitch. The apparatus includes a pair of spaced-apart side plates. The side plates have first ends. At least one of the first ends of the side plates is connected to the trailer hitch receptacle. The side plates have second ends opposite the first ends which extend outwards from the trailer hitch receptacle. The side plates are configured to receive the frame of the trailer between the side plates. The apparatus includes a connector connected to the side plates near the second ends of the side plates. The connector is extendable between the side plates for fixedly securing the frame of the trailer.

There is further provided a trailer hitch storage apparatus for storing a trailer hitch on a trailer. The trailer has a frame. The trailer hitch storage apparatus includes a trailer hitch receptacle shaped to receive the trailer hitch. The trailer hitch storage apparatus includes a mount for connecting to the trailer. The mount is shaped to at least partially extend about and receive the frame of the trailer. The trailer hitch storage apparatus includes a truss that connects the trailer hitch receptacle and the mount together.

BRIEF DESCRIPTION OF DRAWINGS

The invention will be more readily understood from the following description of preferred embodiments thereof given, by way of example only, with reference to the accompanying drawings, in which.

DESCRIPTION OF THE PREFERRED EMBODIMENTS

Figure 1:
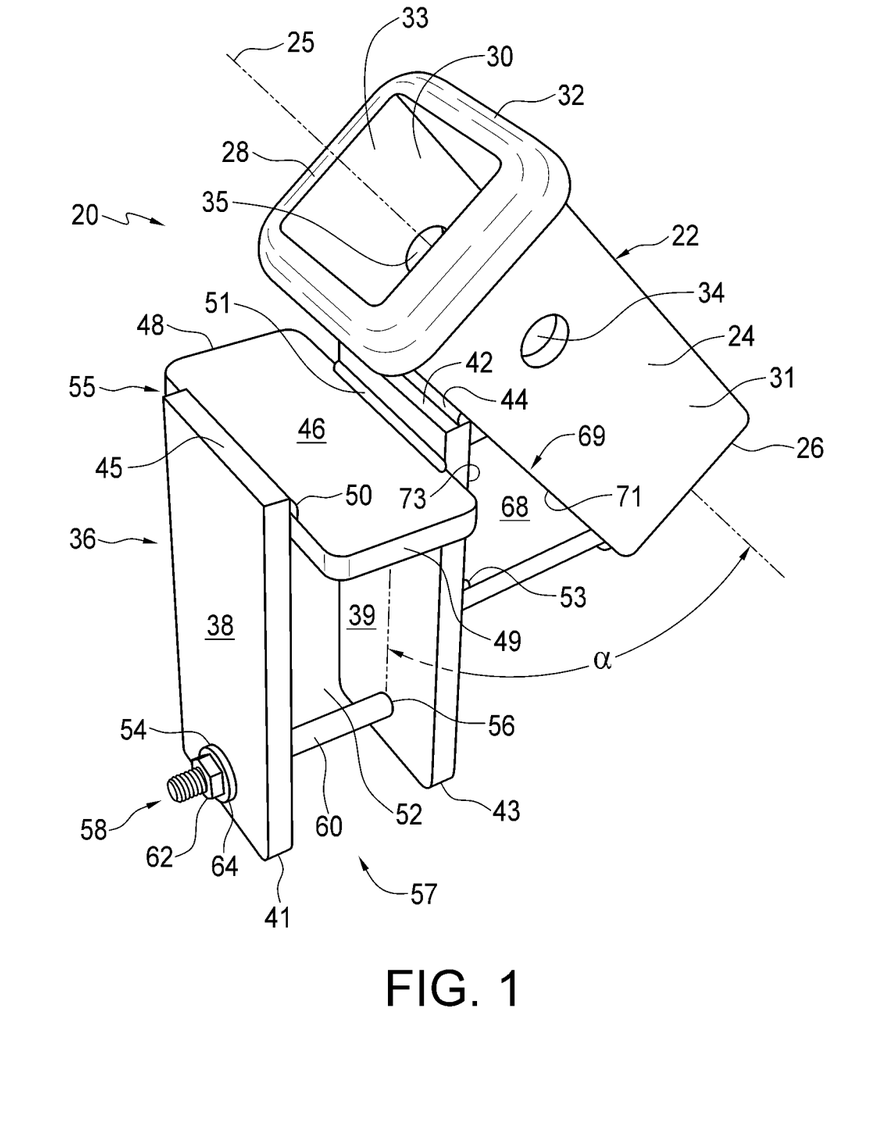
FIG. 1 is a top, front perspective view of a trailer hitch storage apparatus according to one embodiment of the invention.
Figure 3:
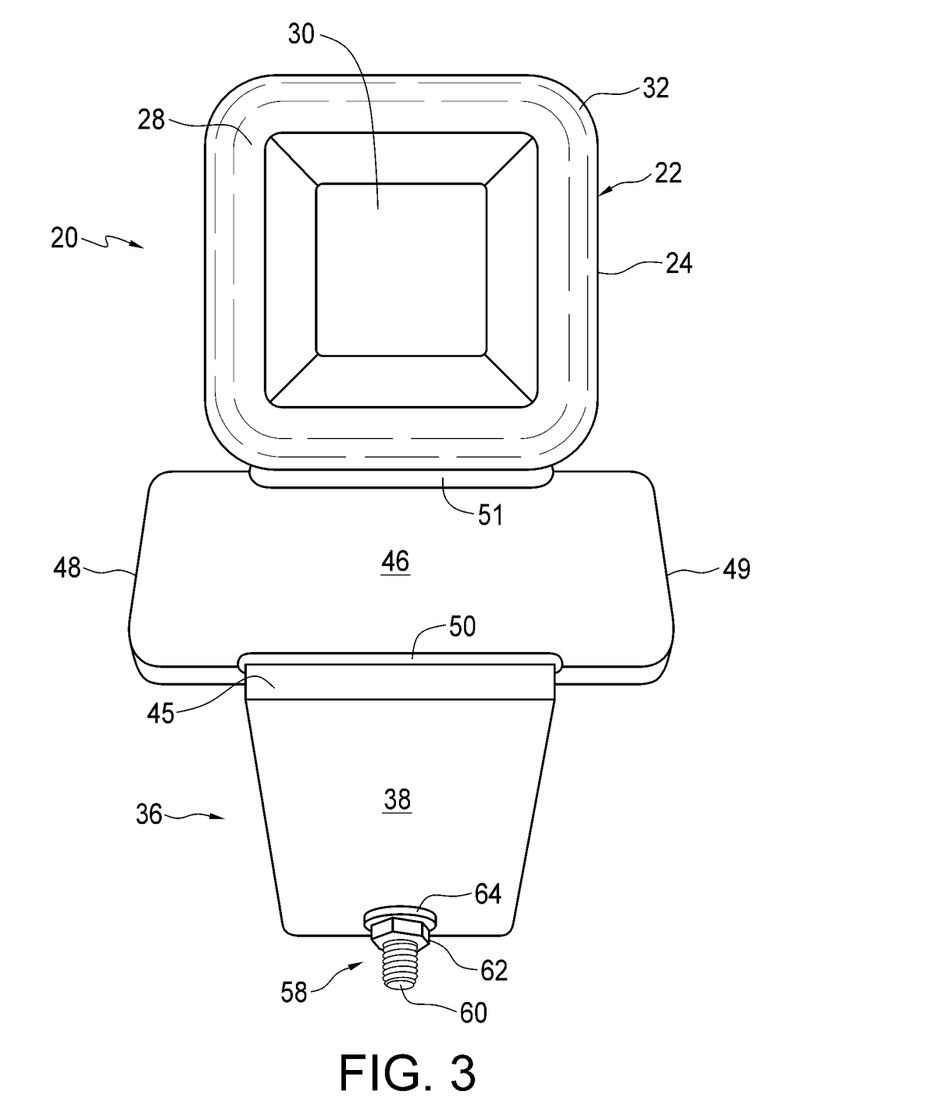
FIG. 3 is a top plan view of the apparatus shown in FIG. 1.
Figure 4:
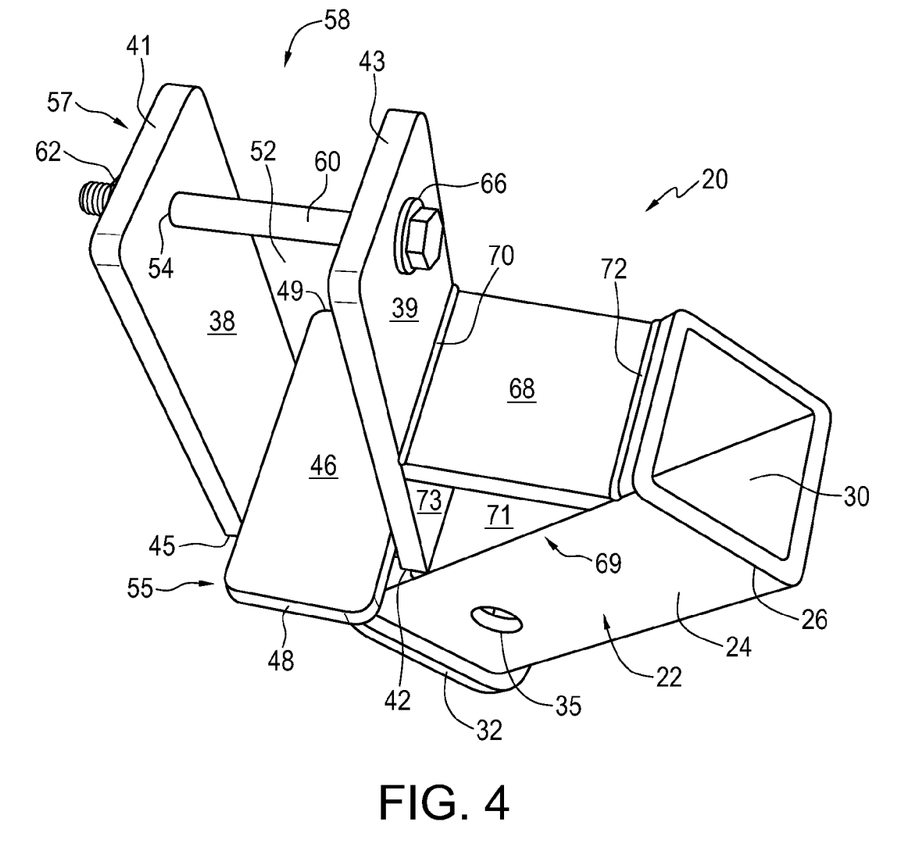
FIG. 4 is a bottom, front perspective view of the apparatus shown in FIG. 1.
Figures 6, 7:
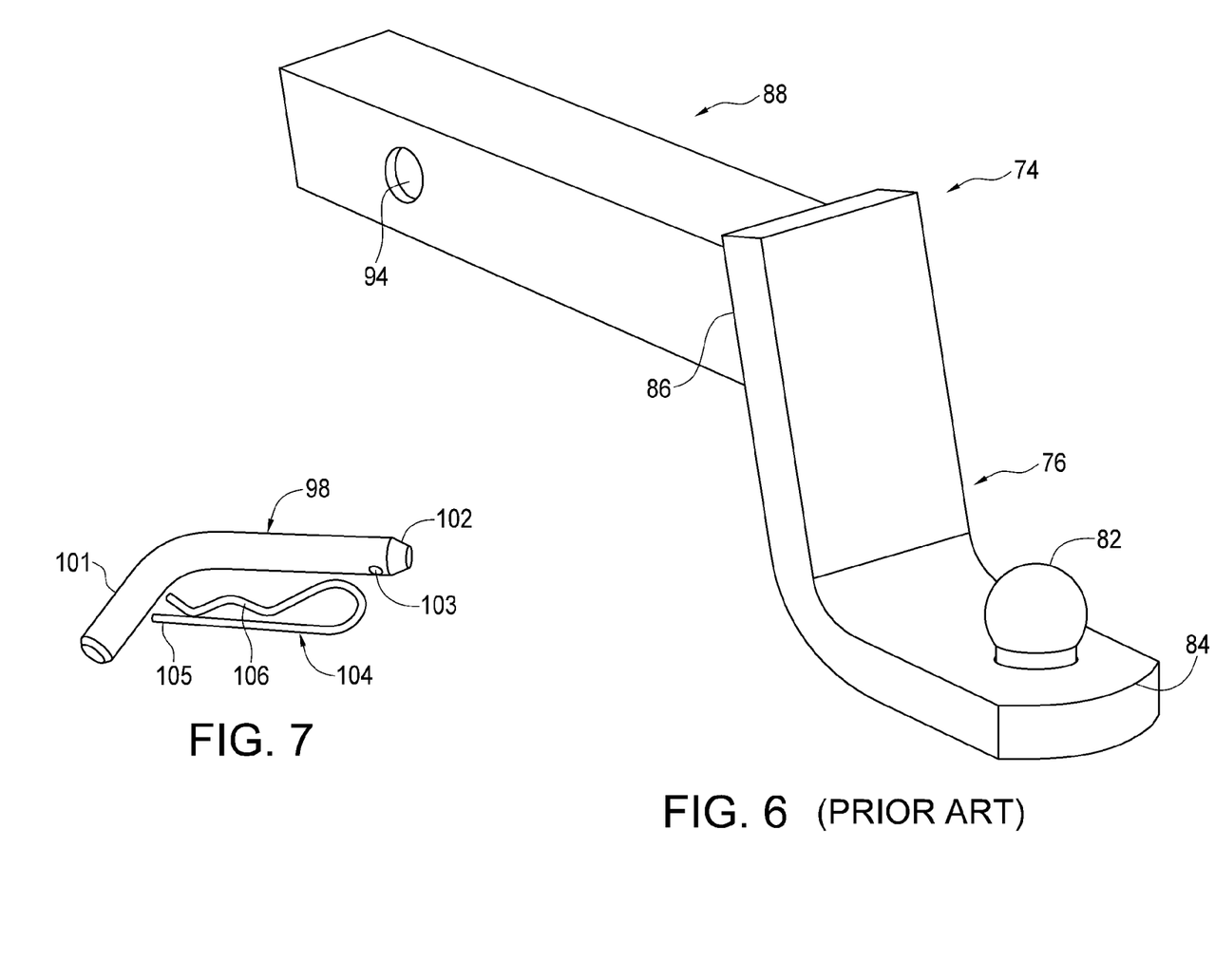
FIG. 6 is a top, front perspective view of a trailer hitch.
FIG. 7 is a perspective view of a pin and a clip therefor that may be used in association with the trailer hitch storage apparatus shown in FIG. 1 according to one preferred embodiment.

Referring to FIG. 1, there is provided a trailer hitch storage apparatus 20. The apparatus is of steel in this embodiment but other metals or materials could be used. The trailer hitch storage apparatus 20 includes a trailer hitch receptacle 22. The trailer hitch receptacle 22 is shaped to receive a trailer hitch in this example a ball mount 74 as shown in FIG. 6. Referring back to FIG. 1, the trailer hitch receptacle 22 in this example is tubular, taking the form of a tube 24 that is squared-shaped in cross-section. The trailer hitch receptacle 22 via tube 24 has a longitudinal, central axis 25. The trailer hitch receptacle 22 has a first end 26 and a second end 28 opposite the first end 26. The trailer hitch receptacle 22 has an opening 30, square in this example, that extends from the first end 26 through to the second end 28, as best shown by FIGS. 1, 3 and 4.

Referring back to FIG. 1 the trailer hitch receptacle 22 has a pair of aligned apertures 34 and 35, respectively, that extend through two opposing walls 31 and 33 of the tube 24, respectively. The apertures 34 and 35 are disposed between the first end 26 and the second end 28 of the trailer hitch receptacle 22. Apertures 34 and 35 in this example are shaped to accommodate a standard pin 98 and clip 104 therefor, as shown in FIG.

7, that normally are used to fix ball mount 74, shown in FIG. 6, to a trailer hitch receiver (not shown).

The trailer hitch storage apparatus 20 includes a rounded flange 32 that extends around the tube 24 at the second end 28 of the trailer hitch receptacle 22.

The trailer hitch storage apparatus 20 includes a mount 36. The mount 36 includes a pair of spaced-apart, parallel side plates 38 and 39. Side plates 38 and 39 have first ends 45 and 42, respectively, which are adjacent to each other. Side plates 38 and 39 also have second ends 41 and 43, respectively, which are adjacent to each other. The second ends 41 and 43 of side plates 38 and 39 are opposite the first ends 45 and 42 of the side plates 38 and 39, respectively. Mount 36 further includes in this example an end plate 46. The plates are rectangular in this example but could be other shapes in other embodiments. End plate 46 extends perpendicularly between both side plates 38 and 39, respectively, in this example. End plate 46 is disposed near first ends 45 and 42 of the side plates 38 and 39, respectively, in this example. As best shown in FIG. 3, end plate 46 connects to side plate 38 in this example via weld 50 and connects to side plate 39 in this example via weld 51. End plate 46 is thus integrally connected to side plates 38 and 39. Side plates 38 and 39 are thus operatively connected together via end plate 46. Referring back to FIG. 1, end plate 46 is disposed generally perpendicular to both side plates 38 and 39, respectively. End plate 46 has a first end 48 and a second end 49 opposite the first end 48. In this example end plate 46 has portions thereof which extend past the side plates 38 and 39 as for example shown by ends 48 and 49, which are both extended outwards beyond the side plates 38 and 39. Mount 36, with its end plate 46 and side plates 38 and 39, is thus generally u-shaped with a closed end 55 and an open end 57 opposite the closed end 55. Side plates 38 and 39 and end plate 46 together form an opening 52.

Side plates 38 and 39 have a pair of aligned apertures 54 and 56, respectively, that extend through the side plates 38 and 39, respectively. The apertures 54 and 56 are disposed adjacent to second ends 41 and 43, respectively, of the side plates 38 and 39, in this example.

Figure 2:
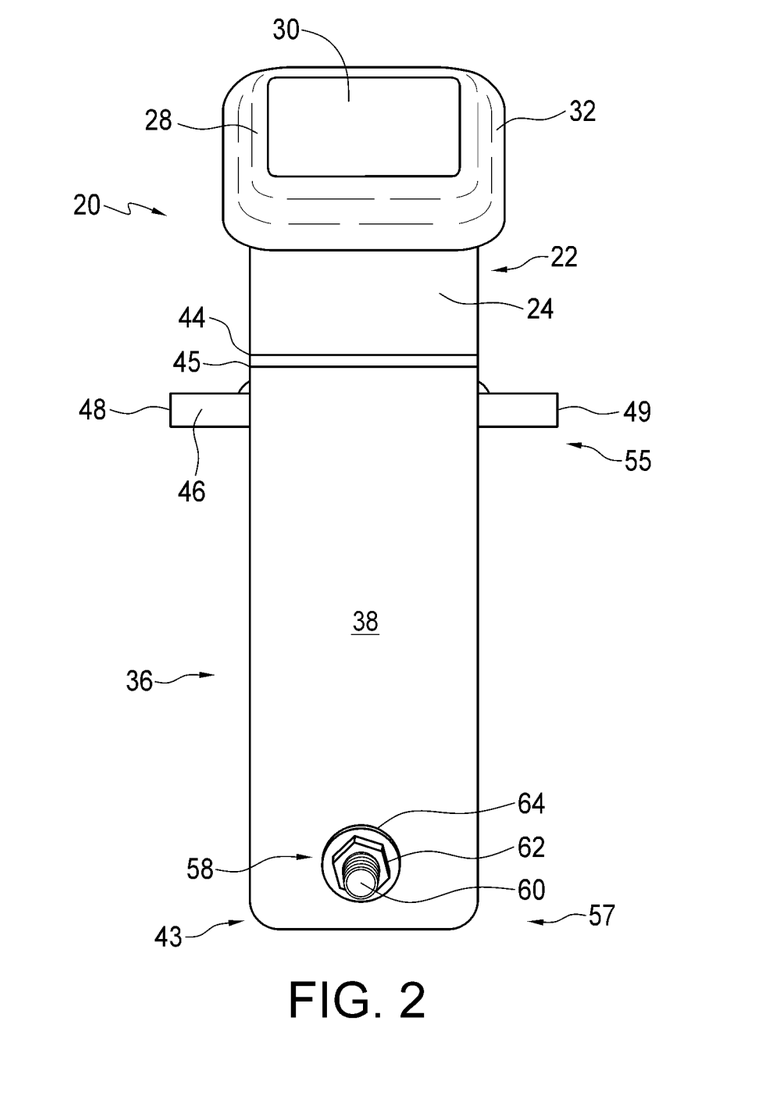
FIG. 2 is a side elevation view of the apparatus shown in FIG. 1.

Mount 36 is connected to and is angularly disposed in relation to the trailer hitch receptacle 22. In this example mount 36 is connected to the trailer hitch receptacle 22. End 42 of the side plate 39 connects to the tube 24 via weld 44, as best shown in FIGS. 1 and 2. The pair of side plates 38 and 39 operatively extend outwards from the trailer hitch receptacle 22 at an angle α. Put another way longitudinal axis 25 of the trailer hitch receptacle 22, and thus the trailer hitch receptacle 22 itself, extends angularly away from side plate 39 at an angle α. Angle α preferably ranges from between 0 to 90 degrees and in this example angle α is equal to 40 degrees.

The trailer hitch storage apparatus 20 includes a brace 68. Brace 68 extends between and connects to both the mount 36 and the trailer hitch receptacle 22. In this example brace 68 connects perpendicularly to the mount 36 at side plate 39. Brace 68 is disposed between first end 42 of the side plate 39 and second end 43 of the side plate 39. Brace 68 connects to side plate 39 in this example via weld 53 shown in part in FIG. 1. Brace 68 also connects to side plate 39 in this example via weld 70 shown in FIG. 4.

Referring back to FIG. 1 brace 68 connects to tube 24 of the trailer hitch receptacle 22. Brace 68 connects to the tube 24 near the first end 26 of the trailer hitch receptacle 22 in this example. As best shown in FIG. 4, brace 68 connects to the tube 24 via weld 72. As seen in FIG. 4, a longitudinal portion of side plate 39 aligns with at least a portion of tube 24. Side plate 39, tube 24 and brace 68 thus form a truss 69. More particularly, truss 69 includes wall 71 of the tube 24 as best shown in FIG. 4, portion 73 of side plate 39, and brace 68 as shown in FIG. 1. Truss 69 thus may be said to have one side which connects to the trailer hitch receptacle 22 and another side which connects to the mount 36. In this case, one side of the triangular truss is one of the side plates, one side of the triangular truss is one of the receptacle 22 and one side of the triangular truss is the brace 68, which is substantially perpendicular to the side plates 38 and 39.

Figure 5:
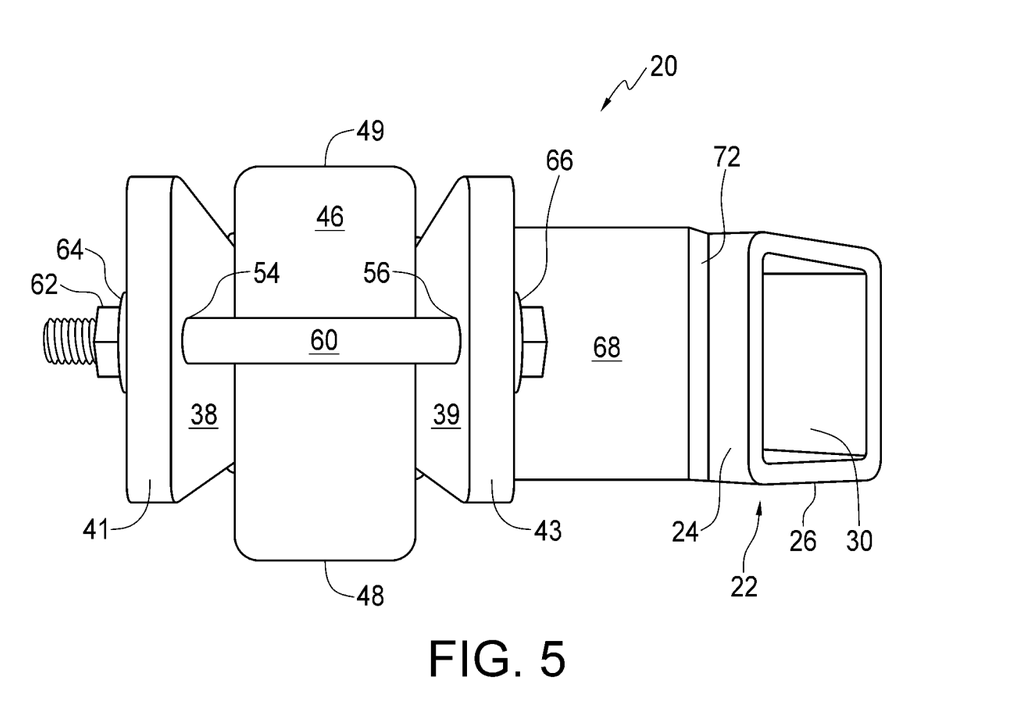
FIG. 5 is a bottom perspective view of the apparatus shown in FIG. 1.

Referring back to FIG. 1 the trailer hitch storage apparatus 20 includes a connector 58. The connector 58 in this example includes a bolt 60, as best shown in FIG. 4, shaped to extend through the apertures 54 and 56 of the side plates 38 and 39, respectively. The bolt 60 is thus connectable to and extendable across both of the side plates 38 and 39. Referring to FIG. 5 the connector 58 also includes a washer 66 in this example shaped to pass around the bolt 60 and that is disposable between the bolt 60 and side plate 39. The connector 58 also includes a nut 62 and a further washer 64 in this example. The connector 58 is configured such that bolt 60 may receive the washer 64 and threadably receive the nut 62 as shown in FIG. 1. As nut 62 is tightened in the clockwise direction this causes washer 64 to abut side plate 38 and washer 66 to abut side plate 39, which in turn causes side plates 38 and 39 to move closer together relative to each other. The connector 58 together with the side plates 38 and 39 may thus be said to function in part as a clamp-like device.

Figure 8:
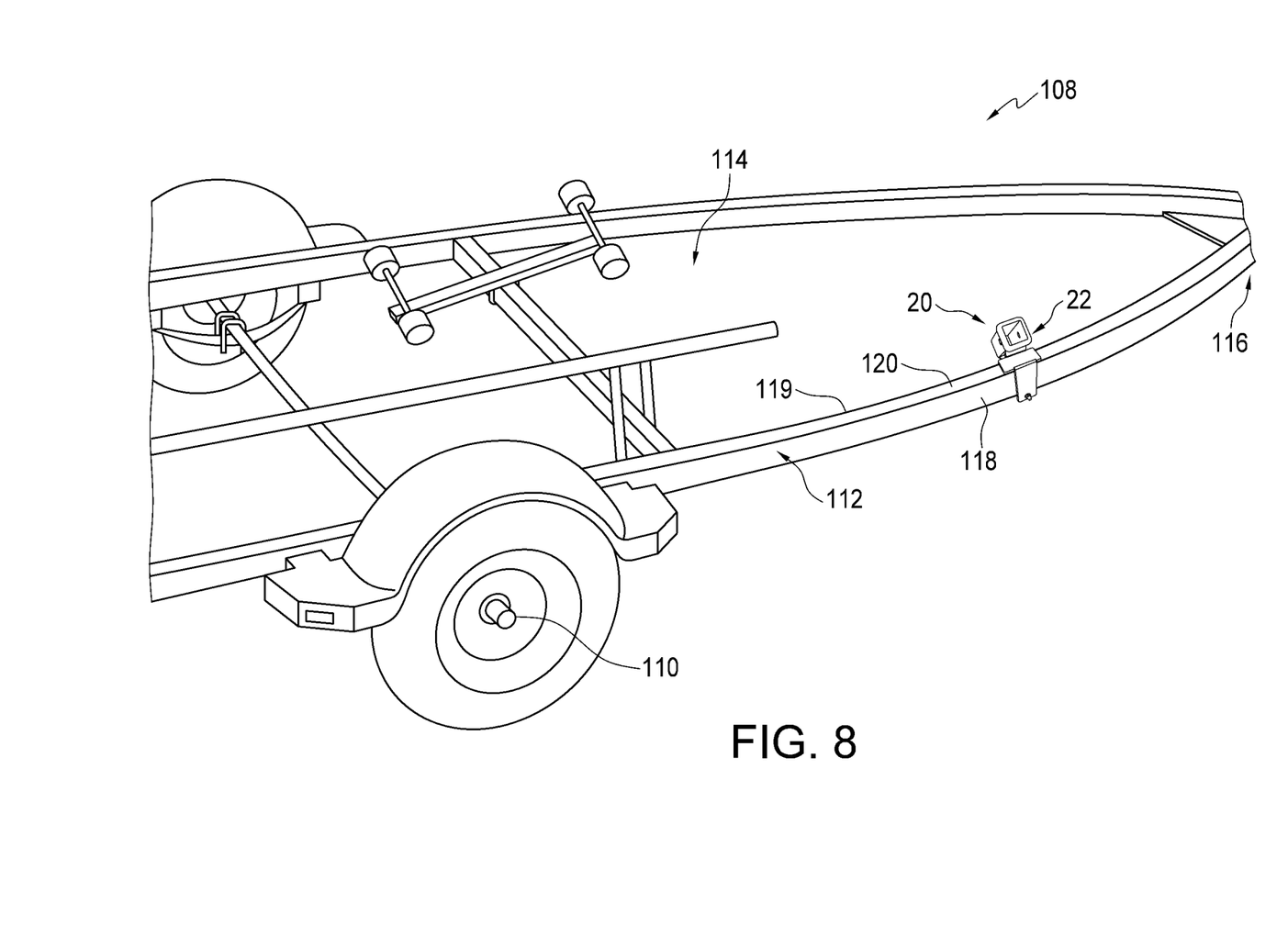
FIG. 8 is a top, side perspective view of a trailer with the trailer hitch storage apparatus shown in FIG. 1 connected thereto, the trailer being shown partially broken away.

Referring to FIG. 6, ball mount 74 will now be described in further detail. Ball mount 74 is conventional and includes a curved flange 76. The flange 76 has a proximal end 86 and a distal end 84 spaced-apart from the proximal end 86. The ball mount 74 includes a tow ball 82 mounted on and extending from the flange 76 adjacent the distal end 84 of the flange 76. The tow ball 82 is for connecting to a trailer 108, as shown in FIG. 8, and more specifically for connecting to a tongue coupler (not shown) extending from a trailer tongue 116 of the trailer 108. The ball mount 74 includes a rectangular tube 88 for inserting within the receiver of a truck (not shown). Tube 88 connects to the flange 76 at end 86 of the flange 76. Referring to FIG. 1 the trailer hitch receptacle 22 and more specifically tube 24 is so shaped as to receive tube 88 of the ball mount 74 therewithin. Referring back to FIG. 6 the ball mount 74 includes a pair of aligned apertures 94 extending transversely through the tube 88, only one of which is shown. Referring to FIGS. 1 and 6, apertures 34 and 35 of the trailer hitch receptacle 22 are so positioned as to be alignable with apertures 94 of the ball mount 74 when the ball mount 74 is disposed within the trailer hitch receptacle 22.

Referring to FIG. 7, as previously mentioned, pin 98 and clip 104 are conventional and typically used to connect the ball mount 74 to a trailer hitch receiver (not shown). Pin 98 is L-shaped with a transversely extending aperture 103 therethrough by end 102 and a protruding portion in this example a handle 101 opposite end 102. Pin 98 is thus shaped to selectively extend through apertures 94 of the ball mount 74 shown in FIG. 6, with end 102 extending outwards from one side of the ball mount and the handle 101 extending outwards from the other side of the ball mount. Clip 104 has an elongate portion 105 shaped to fit within and partially extend through aperture 103 of the pin 98. Clip 104 also has a bent portion in this example corrugated portion 106 connected to the elongate portion 105. Corrugated portion 106 acts to hold clip 104 in place upon being the clip being inserted within aperture 103.

FIG. 8 shows the trailer 108 according to one example. Trailer 108 in this example includes a pair of wheels 110 and a frame, as indicated by frame 112. Wheels 110 are rotatably mounted to the frame. The frame also functions to receive a boat or the like in the region generally indicated by numeral 114. Frame 112 is generally rectangular in section and includes spaced-apart, side walls 118 and 119 and top 120. The trailer frame side walls 118 and 119 can be of various heights such as, for example, four inches, six inches or eight inches.

Figure 9:
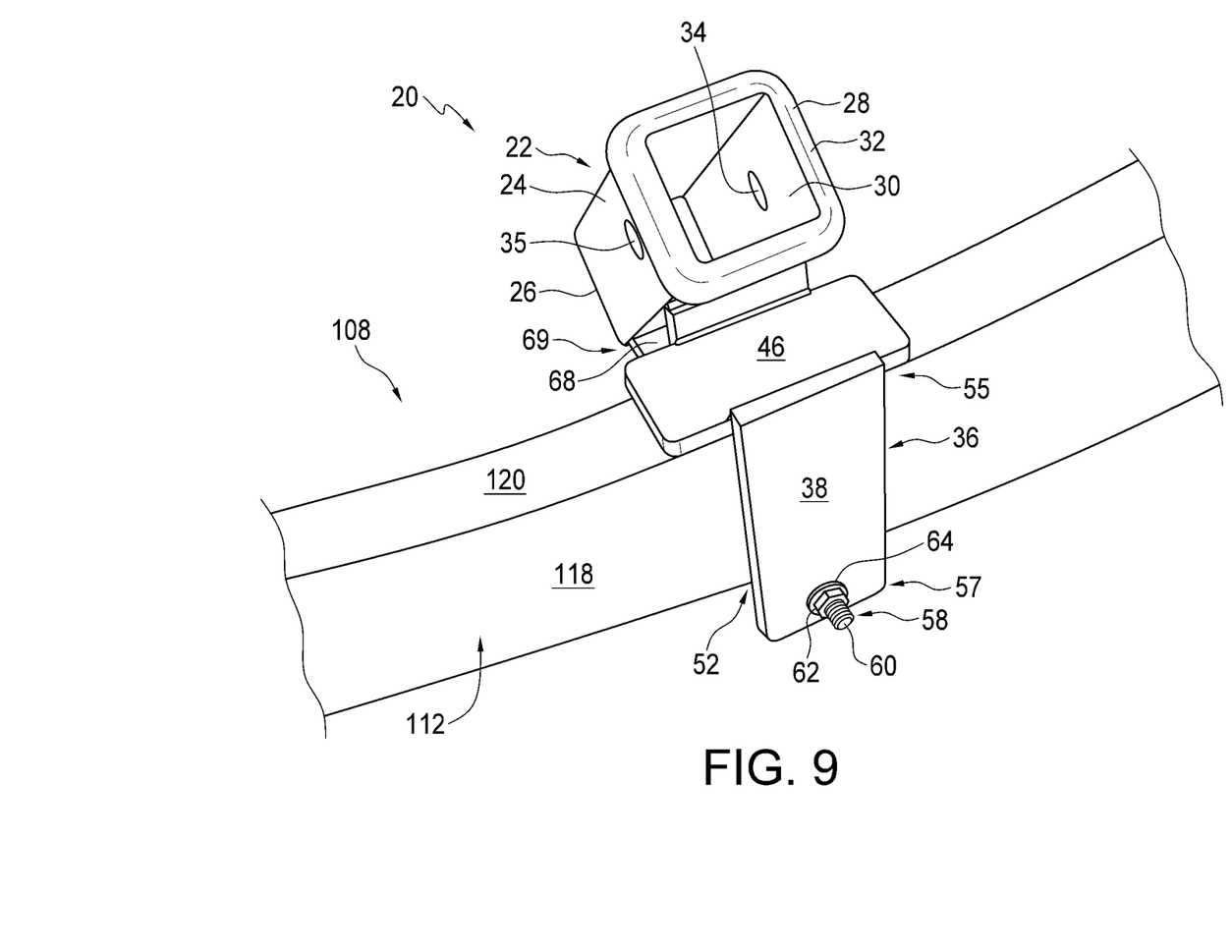
FIG. 9 is an enlarged fragmentary view of the trailer showing the frame thereof and the trailer hitch storage apparatus shown in FIG. 8.

Referring to FIGS. 1 and 9, end plate 46 is shaped to overlay and extend along top 120 of frame 112. The side plates 38 and 39 as indicated by side plate 38 are so spaced-apart and configured as to extend over side walls 118 and 119, respectively. With the connector 58 removed, the trailer hitch storage apparatus 20 is thus mountable onto the frame 112. In this example end plate 46 thus disposed may abut against and extend along top 120 of the frame 112. Side plates 38 and 39 may also abut against side walls 118 and 119 of the frame 112. The connector 58 and more specifically bolt 60 passes through apertures 54 and 56 and extends between the side plates 38 and 39. The bolt 60, washer 64, and nut 62 are used to secure the mount 36 of the apparatus 20 to the frame 112, in this example.

Figure 10:
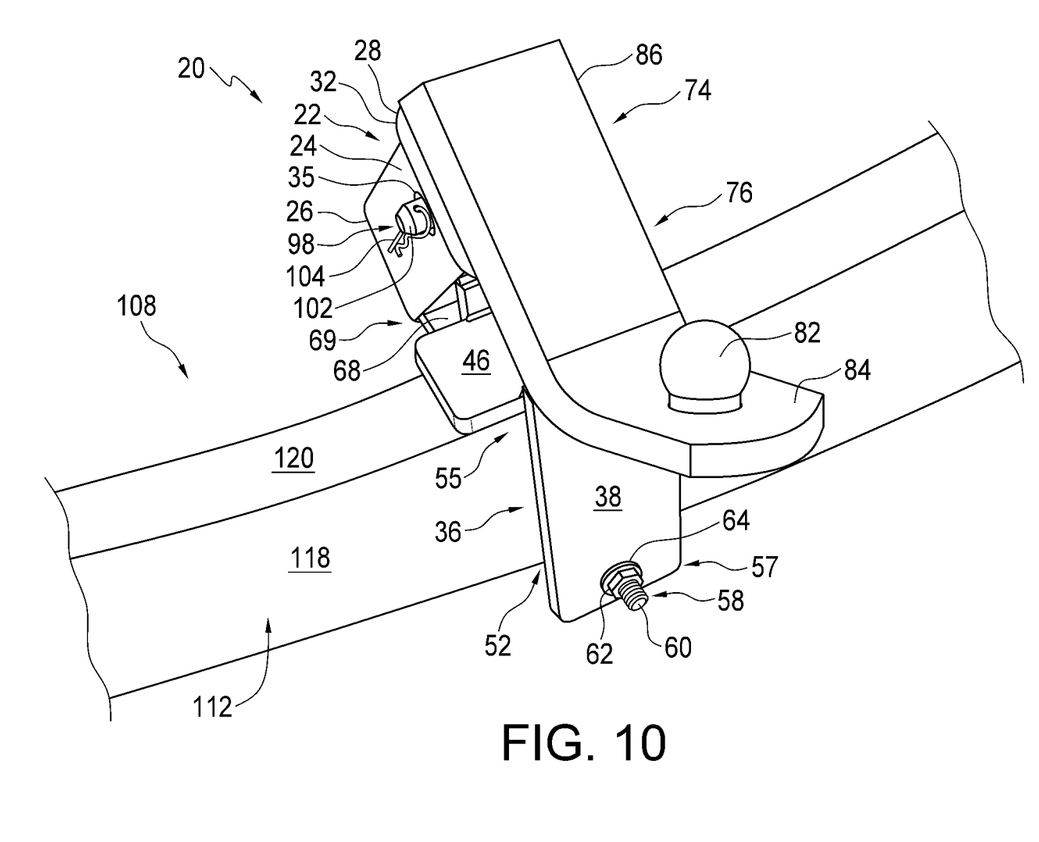
FIG. 10 is an enlarged fragmentary view of the trailer showing the frame thereof and the trailer hitch storage apparatus shown in FIG. 8 and with the trailer hitch shown in FIG. 6 connected to the trailer hitch storage apparatus.

Referring to FIGS. 9 and 10 the trailer hitch storage apparatus 20 is shown ready to receive the ball mount 74 shown in FIG. 6 via opening 30. FIG. 10 shows the ball mount 74 disposed within the trailer hitch receptacle 22. The trailer hitch storage apparatus 20 so configured allows the apertures of the ball mount 74 to align with the apertures 34 and 35 of the tube 24. According to one preferred embodiment, pin 98 may then be disposed through said apertures for securing the trailer hitch within the trailer hitch receptacle and thus to the trailer 108. Clip 104 may then be inserted through aperture 103 of the pin 98 to inhibit the pin from slipping out of apertures 34 and 35 of the tube 24.

Figure 11:
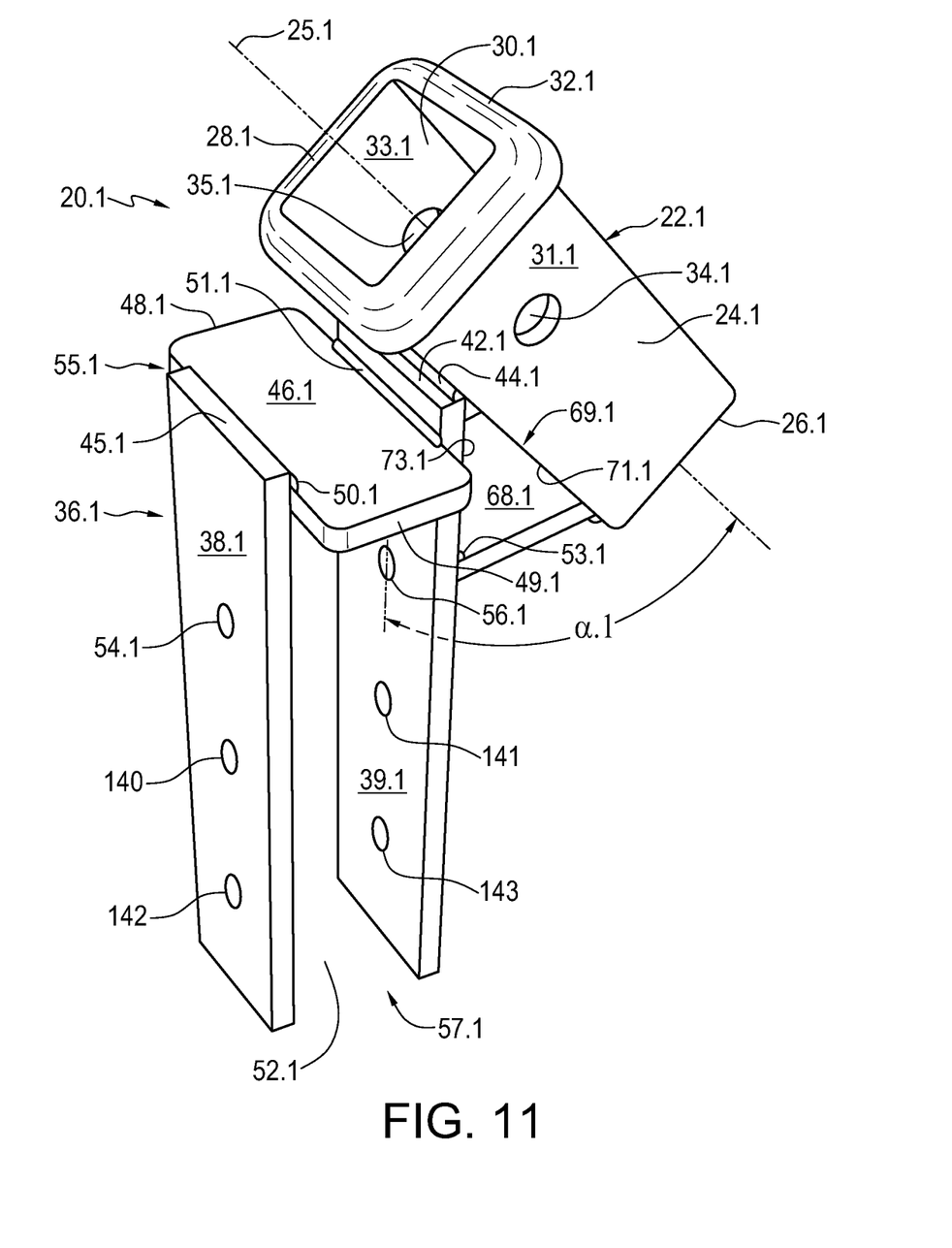
FIG. 11 is a top, front perspective view of a trailer hitch storage apparatus according to another embodiment.

FIG. 11 shows a trailer hitch storage apparatus 20.1 according to another embodiment. Like parts have like numbers and function as the embodiment of FIG. 1 with the addition of "0.1". Trailer hitch storage apparatus 20.1 is substantially the same as trailer hitch storage apparatus 20 shown in FIGS. 1 to 10 with the exception that the mount 36.1 has side plates 38.1 and 39.1 that are relatively longer. This enables the mount 36.1 to have a plurality of spaced-apart pairs of apertures, in this example three pairs of apertures, namely, apertures 64.1 and 56.1, 140 and 141, and 142 and 143. In this example the pairs of apertures are spaced-apart at two inch intervals to accommodate different trailer frames' sizes. The mount 36.1 so configured may accommodate, for example, a four inch, six inch or eight inch trailer frame. Apparatus 20.1 thus provides the further advantage of accommodating a greater variety of different-sized trailer frames.

Figure 12:
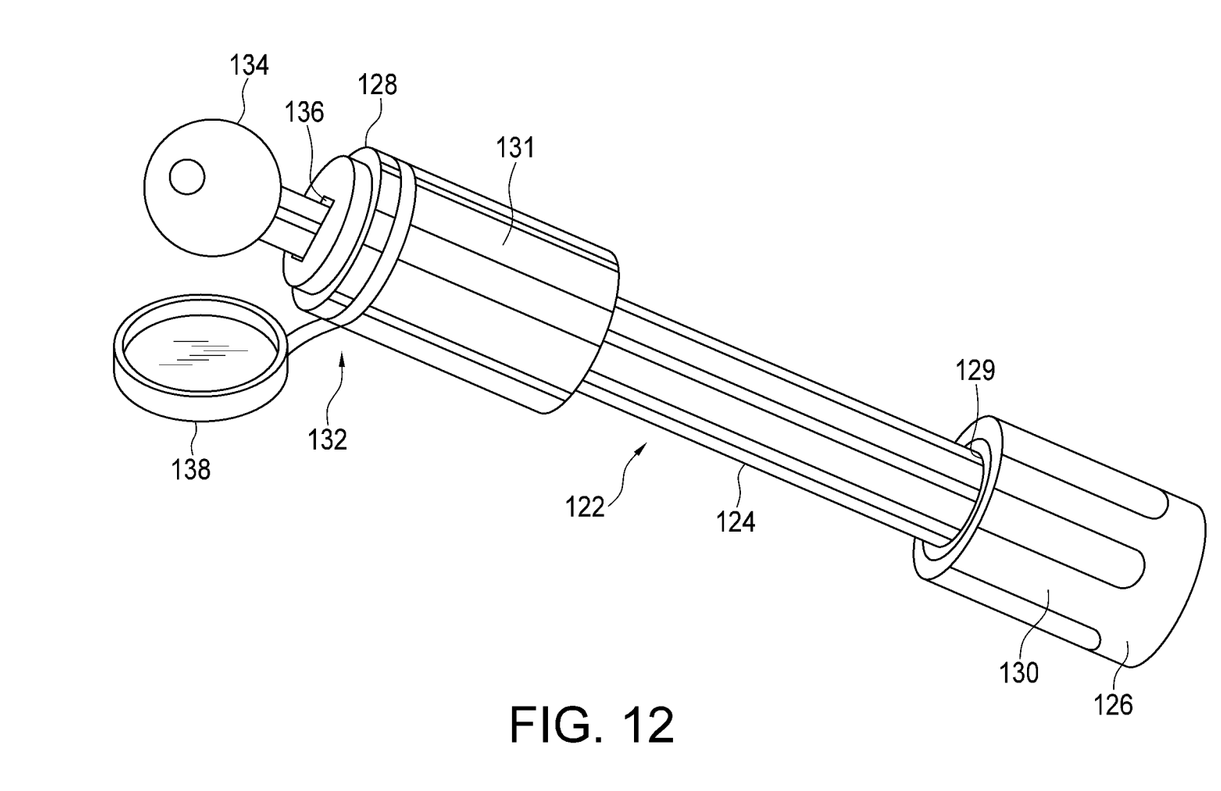
FIG. 12 is a perspective view of a locking pin that may alternatively be used in association with the trailer hitch storage apparatus shown in FIG. 1.

FIG. 12 shows a locking pin 122 which may be used in the place of pin 98 and clip 104 shown in FIGS. 7 and 10. The pin 122 is conventional and can be bought off the shelf. Pin 122 has an enlarged portion in this example boss 130 located at a first end 126 of the pin 122. Pin 122 also has a further enlarged portion in this example a lock cylinder 131 located at a second end 128, which is opposite the first end 126. The pin 122 includes a shaft 124 extending between the first end 126 and the second end 128 through sockets in the cylinders such as socket 129 in boss 130 and a similar socket (not shown) in lock cylinder 131. Shaft 124 is shaped to selectively extend through both apertures 34 and 35 of the trailer hitch receptacle 22 shown in FIG. 1 and apertures 94 of the ball mount 74 shown in FIG. 6. The pin 122 includes a locking mechanism 132 including a key 134 and a keyhole 136 shaped to receive the key 134. When the pin 122 is in its locked mode boss 130 is fixedly connected to shaft 124. To unlock the pin 122 waterproof cap 138 is removed, key 134 is inserted within keyhole 136 and then turned. This in turn will allow one of the boss 130 and the lock cylinder 131 to be removed in order to pass shaft 124 through apertures 34 and 35 shown in FIG. 1 and apertures 94 shown in FIG. 6. Locking pins, including their parts and function, are well known to those skilled in the art and therefore pin 122 will not be discussed in further detail.

Many advantages result from the structure of the present invention. For example, because the apparatus as herein disclosed is configured for mounting to a trailer, this provides the advantage of ensuring that the correct ball mount is matched with the correct trailer. Storing the ball mount on the trailer provides the further advantage of ensuring that the correct ball mount is readily available. The problems associated with trying to force fit together different ball mounts of varying sizes to non-matching trailers are thus reduced if not eliminated.

The apparatus as herein disclosed may be relatively more long-lasting because by being configured to mount to a trailer it may be less exposed debris, dirt and the like, compared to storage devices for example mounted underneath a truck. This is important because when the trailer hitch is removed from the device for transporting a trailer, one wants to ensure that the trailer hitch storage apparatus remains safely and securely connected to withstand bumps and vibrations.

The two spaced-apart side plates together with the end plate provide a structure that is relatively more robust and thus better able to withstand shear forces, torsional forces, fatigue failure through vibrations and the like compared to some prior art devices.

This is further reinforced by the brace connected to and angularly extending between both the mount and the trailer hitch receptacle. The brace and the truss (or triangular structure) thereby act to further enhance the structural integrity of the apparatus, ensuring that the apparatus is even more resistant to failure and wear and tear.

In view of the above, the apparatus as herein disclosed provides the advantage of being readily attachable and usable on any number of different trailers. Also the apparatus does not require any need to drill into, modify or otherwise damage existing trucks or trailers. Thus apparatus provides the advantage of not adversely affecting the re-sell value of the truck or trailer.

By using the storage apparatus as herein disclosed to store the ball mount out of the way of the trailer hitch receiver, one can avoid banging one's legs/shins into the ball mount which would otherwise remain attached to a vehicle when walking behind the vehicle or when needing access to the truck box or SUV trunk. Also, leaving a ball mount on a vehicle while driving around may pose a potential risk of rear-ender accidents or backing up accidents because the trailer hitch extends beyond the bumper and can alter a driver's perception of how close or far away their vehicle is from the vehicle in front of them. Thus, the use of the storage apparatus as herein disclosed provides the further advantage of acting to reduce accidents.

It will be appreciated that many variations are possible within the scope of the invention described herein. For example bolt 60 and nut 62 are just one example of a connector. Those skilled in the art will appreciate that there are many other connectors, such as fasteners, latching mechanisms and the like, that may be used to the same effect.

Instead of pins 98 and 122, a shaft extending between the apertures of the trailer hitch receptacle and ball mount may be used to similar effect. The shaft may be held in place by being so shaped as to snugly fit through the apertures and at least partly frictionally engage tube 24 and/or tube 88 of the ball mount 74.

The apparatus as herein described discloses various welds for connecting its various parts together. The exact location and number of these welds may vary greatly and their description is not intended to be limiting. Moreover those skilled in the art will appreciate that there are many other ways through which the various parts of the apparatus may be connected such as mechanical fasteners.

While ball mount 74 is discussed in FIG. 6 those skilled in the art will appreciate that the apparatus as herein disclosed may equally operate with other types of trailer hitches.

It will be understood by someone skilled in the art that many of the details provided above are by way of example only and are not intended to limit the scope of the invention which is to be determined with reference to the following claims.

What is claimed is:

1. A trailer hitch storage apparatus for storing a trailer hitch on a trailer, the trailer having a frame and the trailer hitch storage apparatus comprising:
    a trailer hitch receptacle that is a tube shaped to receive the trailer hitch;
    a mount for connecting to the trailer, the mount being u-shaped to receive the frame of the trailer, the mount having a pair of spaced-apart side plates, the side plates being configured to at least partially extend about the frame of the trailer, and an end plate extending perpendicular to and integrally formed with each of the side plates, the side plates and the end plate together forming an opening within which the frame is received, the end plate being configured to abut with and at least partially extend over the frame, the mount operatively connecting to and angularly extending outwards from the trailer hitch receptacle; and
    a triangular truss, one side of the truss being one of the side plates, one side of the truss being a side of the receptacle, and one side of the truss being a brace that is substantially perpendicular to the side plates.

2. The apparatus as claimed in claim 1 wherein the mount has a closed end and an open end for receiving the frame of the trailer and wherein the mount includes a connector configured to selectively connect to and extend between the side plates near the open end when the frame is so disposed between the side plates.

3. The apparatus as claimed in claim 2 wherein the trailer hitch receptacle is connected to and is angularly disposed in relation to said one of the side plates, the one of the side plates having a first end near the closed end of the mount, the first end of the one of the sides plates connecting to and abutting with the trailer hitch receptacle.

4. The apparatus as claimed in claim 2 wherein the side plates have a pair of apertures and wherein the connector comprises a bolt shaped to extend through the apertures and a nut threadably connectable to the bolt.

5. In combination, a trailer hitch and the trailer hitch storage apparatus as claimed in claim 1.

6. The combination as claimed in claim 5, the trailer hitch having an aperture extending therethrough, wherein the trailer hitch receptacle has at least one corresponding aperture extending therethrough, the at least one aperture of the trailer hitch receptacle being alignable with the aperture of the trailer hitch when the trailer hitch is received within the trailer hitch receptacle, and wherein the combination further includes a pin shaped to extend through both the at least one aperture of the trailer hitch receptacle and the aperture of the trailer hitch for securing the trailer hitch within the trailer hitch receptacle.

7. The apparatus as claimed in claim 1 wherein the end plate is connected to and is angularly disposed in relation to the trailer hitch receptacle.

8. The apparatus as claimed in claim 1 wherein the side plates extend outwards from the trailer hitch receptacle at an angle of between 0 and 90 degrees.

9. The apparatus as claimed in claim 1 wherein the brace connects to and extends between the trailer hitch receptacle and the mount, the brace connecting to the mount via said one of the side plates.

10. The apparatus as claimed in claim 1 wherein the trailer hitch receptacle is connected to and is angularly disposed in relation to said one of the side plates.

11. The apparatus as claimed in claim 1 wherein the trailer hitch receptacle is tubular and is squared-shaped in cross-section.

12. The apparatus as claimed in claim 1, wherein a longitudinal portion of said one of the side plates faces at least a portion of the tube.

13. In combination, a trailer and the trailer hitch storage apparatus as claimed in claim 1.

14. The apparatus as claimed in claim 1, wherein the brace is integrally formed with both the mount and said one of the side plates.

15. The apparatus as claimed in claim 1, wherein said one of the side plates has a first end and a second end spaced-apart from the first end, the brace being interposed between the first and second ends of said one of the side plates.

16. The apparatus as claimed in claim 1, wherein a longitudinal portion of said one of the side plates faces at least a portion of the receptacle, the longitudinal portion of said one of the side plates being perpendicular to the end plate.

17. The apparatus as claimed in claim 1, wherein the mount has a top and a side and wherein the trailer hitch receptacle connects to both the top and the side of the trailer mount.

18. The apparatus as claimed in claim 1, wherein the trailer hitch receptacle has a first end and a second end spaced-apart from the first end, the brace connecting to the first end of the trailer hitch receptacle and the trailer mount connecting to the trailer hitch receptacle adjacent to the second end of the trailer hitch receptacle.

19. The apparatus as claimed in claim 1, wherein the trailer hitch receptacle has a first end, a second end spaced-apart from the first end, and an opening extending from the first end of the trailer hitch receptacle to the second end of the trailer hitch receptacle, the opening being shaped to receive a trailer hitch therethrough.

20. A trailer hitch storage apparatus for storing a trailer hitch on a trailer having a frame, the apparatus comprising:
    a trailer hitch receptacle that is a tube shaped to receive the trailer hitch;
    a pair of spaced-apart side plates, the side plates having first ends, one of the first ends of the side plates being connected to the trailer hitch receptacle, the side plates having second ends opposite the first ends, the second ends of the side plates extending outwards from the trailer hitch receptacle, the side plates being configured to receive the frame of the trailer between the side plates;
    an end plate extending perpendicular to and integrally formed with each of the side plates, the side plates and the end plate together forming an opening within which the frame is received, the end plate being configured to abut with and at least partially extend over the frame;
    a connector connected to the side plates near the second ends of the side plates, the connector being extendable between the side plates for fixedly securing the trailer mount to the frame of the trailer; and a triangular truss, one side of the truss being one of the side plates, one side of the truss being a side of the receptacle, and one side of the truss being a brace that is substantially perpendicular to the side plates.

* * * * *